United States Patent
Cheong et al.

(10) Patent No.: US 8,553,626 B2
(45) Date of Patent: Oct. 8, 2013

(54) APPARATUS AND METHOD FOR SUPPORTING ACCESS IN WIRELESS COMMUNICATION SYSTEM

(75) Inventors: Minho Cheong, Daejeon (KR); Jong-Ee Oh, Daejeon (KR); Yu-Ro Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 383 days.

(21) Appl. No.: 12/634,297

(22) Filed: Dec. 9, 2009

(65) Prior Publication Data

US 2010/0142468 A1    Jun. 10, 2010

(30) Foreign Application Priority Data

Dec. 10, 2008 (KR) .................. 10-2008-0125171
Nov. 11, 2009 (KR) .................. 10-2009-0108504

(51) Int. Cl.
*H04W 72/04* (2009.01)
(52) U.S. Cl.
USPC ............................ 370/329; 370/341; 370/338
(58) Field of Classification Search
USPC .................................. 370/329, 328, 338, 350
See application file for complete search history.

(56) References Cited

U.S. PATENT DOCUMENTS

| | | | |
|---|---|---|---|
| 2004/0264394 A1 | 12/2004 | Ginzburg et al. | |
| 2008/0285477 A1* | 11/2008 | Kuroda et al. | 370/252 |
| 2009/0046681 A1* | 2/2009 | Kalogridis et al. | 370/338 |
| 2009/0092081 A1* | 4/2009 | Balasubramanian et al. | 370/328 |
| 2009/0116389 A1* | 5/2009 | Ji et al. | 370/235 |
| 2009/0274140 A1* | 11/2009 | Cordeiro et al. | 370/350 |
| 2010/0034143 A1* | 2/2010 | Cordeiro et al. | 370/328 |

FOREIGN PATENT DOCUMENTS

| | | |
|---|---|---|
| JP | 2006-521758 | 9/2006 |
| KR | 10-2004-0018642 A1 | 3/2004 |
| KR | 10-2004-0102955 | 12/2004 |
| KR | 10-2005-0023782 | 3/2005 |
| KR | 10-2006-0124593 | 12/2006 |

OTHER PUBLICATIONS

McMAC : A parallel Randezvous Multi channel MAC protocol by So, 2007.*
"Multi-channel MAC Protocol for Improving Channel Efficiency in Wireless Networks," Young-Kyoung Kim et al., Korea Information an Communication Society, May 7, 2008, pp. 549-560.

* cited by examiner

*Primary Examiner* — Dang Ton
*Assistant Examiner* — Pamit Kaur
(74) *Attorney, Agent, or Firm* — Staas & Halsey LLP (57) ABSTRACT

An apparatus and method for supporting access are provided. The method for supporting access in a wireless communication system includes: checking a plurality of stations (STA) which are to get access in a network and a plurality of access nodes of the respective STAs; determining the access priorities of the checked STAs and the priorities of the access nodes of the respective STAs; dividing a wireless resource and channel available in the network into multiple wireless resources and channels; and connecting the access nodes of the respective STAs to the multiple wireless resources and channels using a multi-channel media access control (MAC) protocol.

16 Claims, 5 Drawing Sheets

APPARATUS AND METHOD FOR SUPPORTING ACCESS IN WIRELESS COMMUNICATION SYSTEM

CROSS-REFERENCE(S) TO RELATED APPLICATIONS

The present application claims priority of Korean Patent Application Nos. 10-2008-0125171 and 10-2009-0108504, filed on Dec. 10, 2008, and Nov. 11, 2009, respectively, which are incorporated herein by reference in their entirety.

BACKGROUND OF THE INVENTION

1. Field of the Invention

Exemplary embodiments of the present invention relates to a wireless communication system; and, more particularly, to an apparatus and method for supporting access in a wireless communication system, which support access to effectively use multiple channels in a wireless communication system having multiple nodes such that multiple users communicate through the multiple nodes.

2. Description of Related Art

In a next-generation communication system, studies are actively conducted to provide users with high-speed service with various qualities of service (hereinafter, referred to as QoS). In particular, studies on a Wireless Local Area Network (WLAN) system which is an example of a wireless communication system are actively conducted through the Institute of Electrical and Electronics Engineers (IEEE) 802.11 standard. The current WLAN system performs communication using only channel with a single antenna. Recently, studies have been conducted to apply multiple antennas to the IEEE 802.11 system. To improve the performance of the wireless communication system, various schemes for effectively using resources, for example, channels, time, space and so on have been proposed.

The current WLAN system has a network environment in which a plurality of users have a plurality of access nodes such that the users may effectively use a limited channel to receive a service at a high speed. In the WLAN system, however, a time in which a channel is not used frequency occurs depending on the number of users allocated to the channel and the amount or form of traffic. Accordingly, the utilization efficiency of the limited channel decreases. To solve such a problem, various schemes are considered to perform communication by effectively using a limited channel through a multi-channel Media Access Control (hereinafter, referred to as MAC) technology. However, specific schemes have not yet been proposed.

Therefore, there is demand for a specific access scheme which effectively uses multiple channels in a network environment in which a plurality of users have a plurality of connection nodes in the WLAN system such that the respective users perform communications through the plurality of access nodes.

SUMMARY OF THE INVENTION

An embodiment of the present invention is directed to an apparatus and method for supporting access in a wireless communication system.

Another embodiment of the present invention is directed to an apparatus and method for supporting access in a wireless communication system having a multi-user network environment including multiple nodes.

Another embodiment of the present invention is directed to an apparatus and method for supporting access in a wireless communication system, which effectively use a limited channel in a network environment in which a plurality of users in the wireless communication system have a plurality of access nodes such that the respective users perform communication through the plurality of access nodes.

Another embodiment of the present invention is directed to an apparatus and method for supporting access in a wireless communication system, which stably provide a service to multiple users through multiple channels using a multi-channel Media Access Control (MAC) technology in a Wireless Local Area Network system having a multi-user network environment including multiple nodes.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for supporting access in a wireless communication system includes: checking a plurality of stations (STA) which are to get access in a network and a plurality of access nodes of the respective STAs; determining the access priorities of the checked STAs and the priorities of the access nodes of the respective STAs; dividing a wireless resource and channel available in the network into multiple wireless resources and channels; and connecting the access nodes of the respective STAs to the multiple wireless resources and channels using a multi-channel media access control (MAC) protocol.

In accordance with another embodiment of the present invention, an apparatus for supporting access in a wireless communication system includes: a checking unit configured to check all access nodes existing in a network through a plurality of stations (STA) which are to get access in the network and a plurality of access nodes of the respective STAs, and check a media access control (MAC)/physical (PHY) layer and channel available for the respective STAs in the network; a determination unit configured to determine the access priorities of the checked STAs and the priorities of the access nodes of the respective STAs, and determine the priorities of all the access nodes existing in the network from the determined priorities; a multiplexing unit configured to divide the checked MAC/PHY layer into multiple MAC/PHY layers, and divide the checked channel into multiple channels between which interference is minimized; and a connection unit configured to connect the multiple MAC/PHY layers to the multiple channels through a multi-channel MAC protocol such that the access nodes of the respective STAs are connected to the multiple MAC/PHY layers and the multiple channels.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Embodiments of the present invention provide an apparatus and method for supporting access in wireless communication system, for example, a Wireless Local Area Network (WLAN) and the Institute of Electrical and Electronics Engineers (IEEE) 802.11 system. The apparatus and method for supporting access in accordance with the embodiments of the present invention may be applied to other communication systems.

The apparatus and method for supporting access in accordance with the embodiments of the present invention support access of the WLAN system and the IEEE 802.11 system such that a plurality of stations (hereinafter, referred to as STA) perform communication through their multiple access nodes by effectively using a limited channel in a wireless communication system. The wireless communication system has a network environment in which each of the STAs serving as terminals of a plurality of users have a plurality of access nodes, that is, multiple access nodes. The apparatus and method in accordance with the embodiments of the present invention support a multi-channel Media Access Control (MAC) protocol such that each of the STAs get access to the network through the plurality of access nodes to perform communication. The plurality of STAs perform communication through the respective access nodes using such a multi-channel MAC protocol, and thus stably provide a service to a plurality of users through a limited channel, for example, multiple channels. For example, the IEEE 802.11b system may include three orthogonal channels, and the IEEE 802.11a system may include 12 available channels. The IEEE 802.11 system and the IEEE 802.11a system are examples of the IEEE 802.11 system.

The apparatus and method for supporting access in accordance with the embodiments of the present invention propose the multi-channel MAC protocol as a protocol between STAs of a network such that a plurality of access nodes may perform communication at the same time in a network environment in which each of the STAs has a plurality of access nodes. The apparatus and method support the multi-channel MAC protocol such that the STAs of the network are connected through the respective access nodes to perform communication. In the embodiments, N STAs are set, and M access nodes are set for each of the STAs. In accordance with the setting, N×M access nodes are determined in the network, and the multi-channel MAC protocol is applied to the determined N×M access nodes to accomplish connection in the network.

In this case, to apply the multi-channel MAC protocol to the N×M access nodes, an ad-hoc multi-channel MAC protocol is first applied to the N×M access nodes corresponding to the overall STAs during access request and access approval. In order for such an application, the priorities of inter-user nodes which are access nodes between the STAs are determined to be higher than those of intra-nodes which are internal access nodes of the STAs such that the grouped multi-channel MAC protocol may be applied.

The apparatus and method in accordance with the embodiments of the present invention support the network formation between multiple devices provided in an ad-hoc wireless network system which is an example of the wireless communication system, the use of wireless resources by only one device among the multiple devices depending on interference, and the sharing of the wireless resources through the multi-channel MAC protocol. The ad-hoc wireless network system is a self-organizing system which may be configured with only mobile devices without a separate infrastructure, and may adaptively respond to a communication environment of a network.

The apparatus and method in accordance with the embodiments of the present invention support access using the multi-channel MAC protocol in a Basic Service Set (hereinafter, referred to as BBS) of the WLAN system which is an example of the wireless communication system such that an arbitrary access point (hereinafter, referred to as AP) among a plurality of APs may be connected to STAs having a plurality of access nodes and the STAs may be connected through the plurality of nodes. In the embodiments, an arbitrary internal access node among the access nodes of the respective STAs may be set to have a different access priority from an access node between other STAs. The access priority may be set in such a manner that the internal access node of the arbitrary STA has a higher priority than the access node between other STAs. Furthermore, the access priority may be determined in a different manner, considering various factors such as the network environment of the WLAN system.

The apparatus and method in accordance with the embodiments of the present invention support multi-rendezvous when each of the STAs has a plurality of access nodes in a wireless communication system in which one AP and the plurality of STAs exist, for example, in the WLAN system. To support the multi-rendezvous, the apparatus and method not only apply the multi-channel MAC protocol, but also determine the access priorities of the access nodes inside the STA. At this time, except access nodes which are already connected and used among the access nodes inside each of the STAs, the access priorities of the access nodes determined to be higher than those of access nodes connected to other STAs are used as they are.

Figure 1:
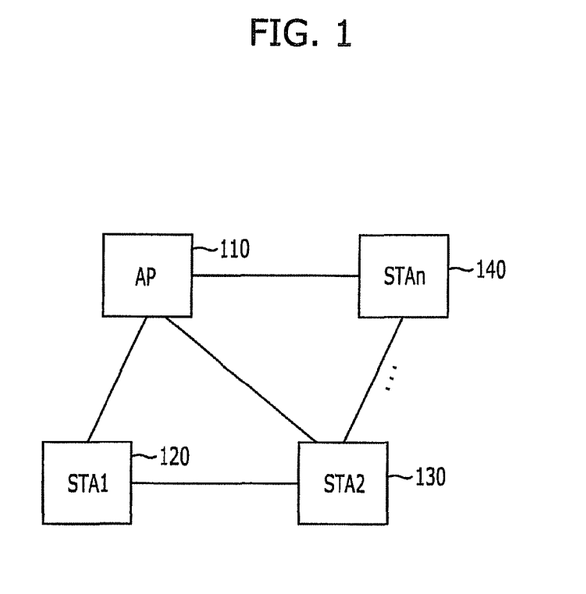
FIG. 1 is a schematic configuration diagram of a wireless communication system in accordance with an embodiment of the present invention.

The apparatus and method in accordance with the embodiments of the present invention support the multi-channel MAC protocol such that the STAs may be connected through the respective access nodes and the multi-rendezvous may be performed in the WLAN system and the IEEE 802.11 system having a network environment in which one AP and the plurality of STAs each having a plurality of access nodes exist. Furthermore, the apparatus and method provide a service to multiple users by transferring and receiving service data through multiple channels. At this time, as at least two or more channels between which interference is minimized are used to transfer and receive service data, interference is minimized when the service data is transferred and received, and the overall data throughput of the system may be improved. Referring to FIG. 1, the wireless communication system in accordance with the embodiment of the present invention will be described more specifically.

FIG. 1 is a schematic configuration diagram of the wireless communication system in accordance with the embodiment of the present invention. FIG. 1 schematically shows the configuration of a WLAN system as one example of the wireless communication system in accordance with the embodiment of the present invention.

Referring to FIG. 1, the WLAN system includes one arbitrary AP 110 and a plurality of user terminals, for example, N STAs 120 to 140 in a BSS. Each of the N STAs 120 to 140 has at least one access node, for example, M access nodes. Therefore, the WLAN system includes the N×M access nodes, and uses the multi-channel MAC protocol in order to support the access of the N STAs 120 to 140 through the N×M access nodes.

Although not shown in FIG. 1, a controller which is provided inside the respective STAs 120 to 140 or in an upper stage of the respective STAs 120 to 140 may support the access of the N×M access nodes existing in the WLAN system. Referring to FIGS. 2 to 5, the multi-channel MAC protocol in the wireless communication system in accordance with the embodiment of the present invention will be described more specifically.

Figure 2:
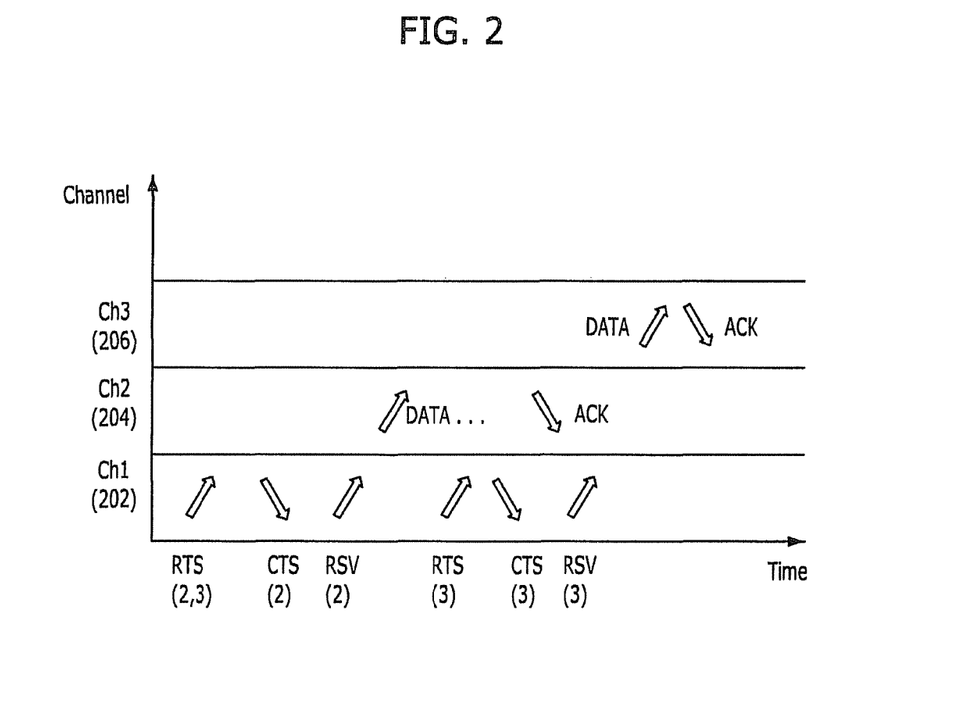
FIGS. 2 to 5 are diagrams explaining multi-channel Media Access Control (MAC) protocols for supporting the access of STAs in the wireless communication system in accordance with the embodiment of the present invention.
Figure 3:
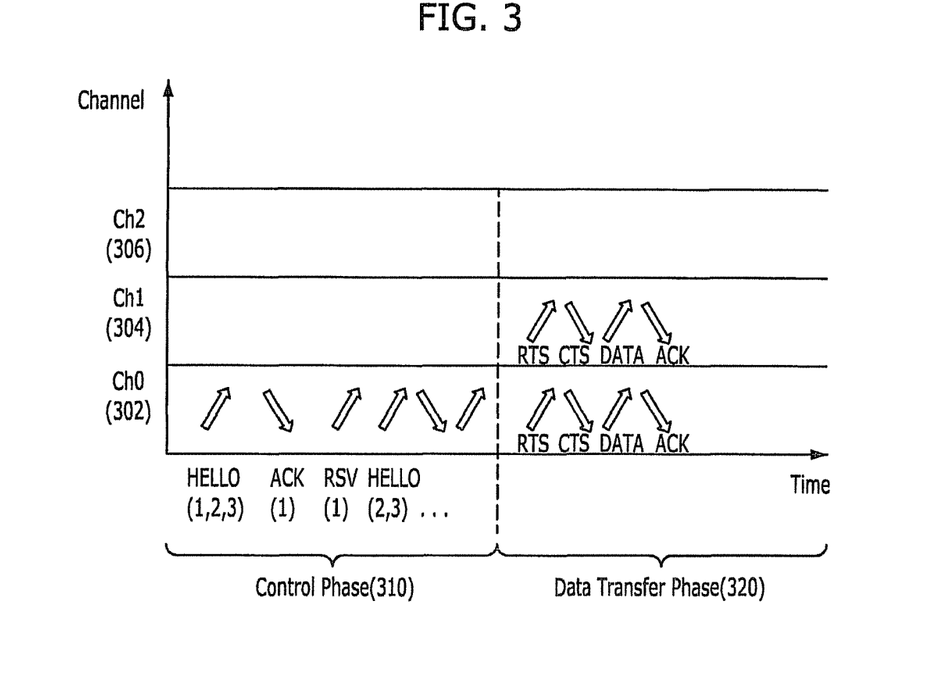
Figure 4:
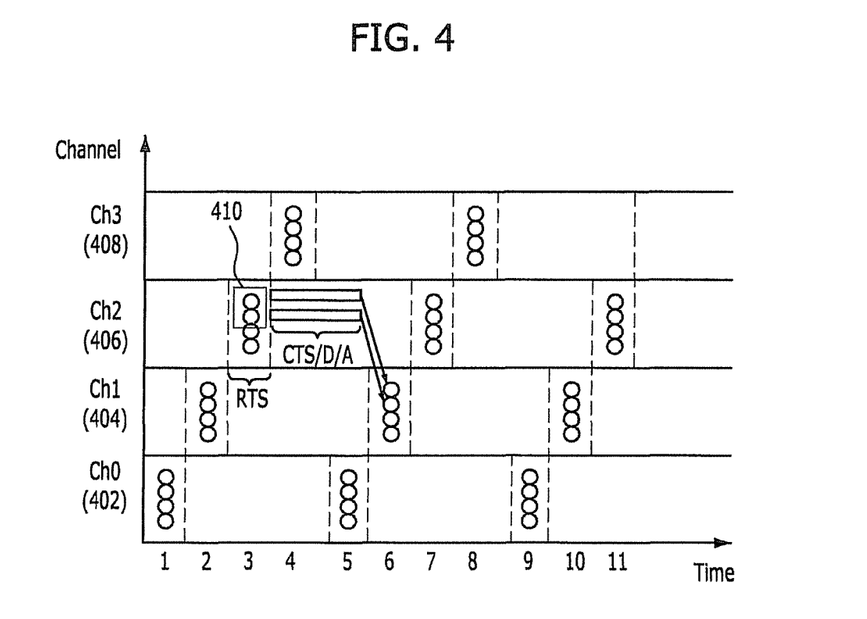
Figure 5:
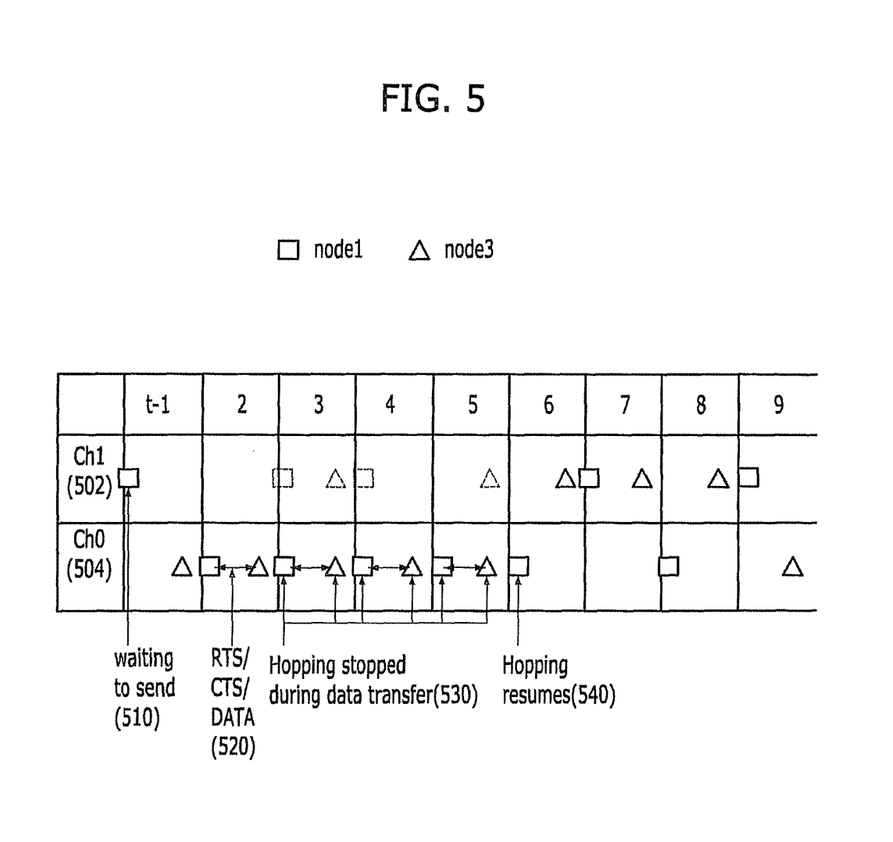

FIGS. 2 to 5 are diagrams explaining multi-channel MAC protocols for supporting the access of STAs in the wireless communication system in accordance with the embodiment of the present invention. FIGS. 2 to 5 schematically show examples of the above-described scheme using the multi-channel MAC protocol. FIG. 2 is a diagram schematically showing a dedicated control channel approach, FIG. 3 is a diagram schematically showing a split phase approach, FIG. 4 is a diagram schematically showing common hoping approach, and FIG. 5 is a diagram schematically showing a multi-channel MAC scheme.

In the dedicated control channel approach shown in FIG. 2, three channels are provided as multiple channels, and a channel Ch1 202 among the three channels Ch1 202, Ch2 204, and Ch3 206 is used as a dedicated channel for transferring and receiving a control signal, and the other channels Ch2 204 and Ch3 206 are used as channels for transferring and receiving data. Accordingly, Request To Send (RTS) packets, Clear TO Send (CTS) packets, and RSV packets are transferred through the channel Ch1 202, and data packets and acknowledgement (ACK) signals depending on whether the data packets are received or not are transferred through the other channels 204 and 206. As the RTS and CTS packets are transferred through the channel Ch1 202 serving as the dedicated channel, channel negotiation of the channels Ch2 202 and Ch3 206 for transferring data packets is performed to acquire a data transfer channel, and the data packets are transferred through the acquired data channel.

In the dedicated control channel approach, the control channel is separated from the data channels, and the transfer of data packets is performed through the data channels depending on whether the RTS and CTS packets transferred through the dedicated channel serving as the control channel are transferred and received or not. Therefore, synchronization for the transfer of data packets through multiple channels is not necessary. Furthermore, the transfer of the RTS and CTS packets is rendezvoused and competitively performed in the dedicated channel serving as the control channel, in order to transfer the data packets. In the dedicated control channel approach, one device transferring and receiving data should be provided with two transceiver modules in which both a transmitter module and a receiver module are implemented. Therefore, the complexity and power consumption of the device may increase. Furthermore, since there is a limitation in allocating the dedicated channel to transfer data packets, the control channel is concentrated. When the multiple channels are narrow-band channels, a proportion occupied by the control channel in the overall available channels may increase. Then, the channels may not be used efficiently.

In the split phase approach shown in FIG. 3, three channels Ch0 302, Ch1 304, and Ch306 may be provided as multiple channels, and time slots of the channels are divided into different phases, for example, a control phase 310 and a data transfer phase 320. In the control phase 310, HELLO signals, ACK signals, and RSV packets are transferred through the channel Ch0 302 of the multiple channels. In the data transfer phase 320, RTS packets, CTS packets, ACK signals, and data packets are transferred through the Ch0 302 and Ch1 304 of the multiple channels.

In the split phase approach, the time slots are divided into the control phase 310 and the data transfer phase 320, the control-related signals are transferred in the control phase 310, and the data packet-related signals, for example, the channel negotiation-related packets for transferring the data packets and the data packets are transferred in the data transfer phase 320. Therefore, the split phase approach may be implemented through a single transceiver. In the split phase approach, the channel negotiation for the transfer of the data packets, that is, the transfer of the RTS and CTS packets is performed through common channels through which the data packets are transferred, unlike the dedicated control channel approach in which the transfer is performed through the dedicated channel.

In the split phase approach, as the transfer of the RTS and CTS packets in the channel negotiation for the transfer of the data packets is performed through the common channels, for example, the channels Ch0 302 and Ch1 304 in the data transfer phase 320, synchronization is required for the transfer of the data packets through the multiple channels. Furthermore, when the packet size of the control-related signals transferred through the channel Ch0 302 of the multiple channels in the control phase 310 is small, all the multiple channels of the control phase 310 are allocated for the transfer of packets having a small size. Therefore, utilization efficiency of the limited channels may decrease.

In the common hopping approach shown in FIG. 4, four channels Ch0 402, Ch1 404, Ch2 406, and Ch3 408 may be provided as multiple channels, and all STAs which are to get access to perform communication for each time slot (1, 2, . . . , or 11) operate in accordance with a common hopping sequence. Furthermore, channel negotiation is performed through the common hopping sequence, that is, RTS and CTS packets are transferred through the multiple channels. In the common hopping approach, the RTS packet is transferred at a predetermined time slot of the channels Ch0 402 to Ch4 408 among the multiple channels. At this time, when the CTS packet is transferred to accomplish the channel negotiation, that is, when a channel for transfer of data packets is acquired, the channel where the channel negotiation is accomplished is left. Then, data packets and an ACK signal depending on whether the data packets are received or not are transferred through the left channel 410.

In the common hopping approach, when the channel negotiation is accomplished through the common hopping sequence for each time slot in the multiple channels, the channel where the negotiation is accomplished is left, and the transfer of data packets is performed through the left channel. Therefore, the common hopping approach may be implemented through a single transceiver. Furthermore, the channel negotiation for each time slot in the multiple channels, that is, the transfer of the RTS and CTS packets through the common channels and the transfer of the data packets through the channel where the channel negotiation is accomplished are performed. Accordingly, synchronization is required for the transfer of the data packets through the multiple channels. Furthermore, as switching is required in accordance with the common hopping sequence, a switching penalty exists.

The above-described three approaches, that is, the dedicated control channel approach, the split phase approach, and the common hopping approach include only one rendezvous channel only at a given time slot. In the dedicated control channel approach and the split phase approach, the channels Ch1 202 and Ch0 302 serve as the rendezvous channel. In the common hopping approach, one rendezvous channel may changed in various manners at a given time slot in accordance with the common hopping sequence. At this time, a parallel rendezvous protocol allows at least one rendezvous channel.

In the multi-channel MAC scheme shown in FIG. 5, two channels Ch0 504 and Ch1 502 may be provided as multiple channels, and access nodes of each STA, for example, access nodes node1 and node3 may operate in a different mode for each time slot through the channels Ch0 504 and Ch1 502. That is, the access nodes node1 and node3 may wait to send packets 510, may transfer RTS, CTS, and data packets (RTS/CTS/DATA) 520, may stop hopping during data transfer 530, or may resume hopping 540. The channels Ch0 504 and Ch1 502 are channels between which interference is minimized, and may be independent channels. Accordingly, when data packets are transferred through the multiple channels including the channels Ch0 504 and Ch1 502, interference during transfer is minimized to improve the overall data throughput of the system. For convenience of description in FIG. 5, the node node1 waits to send packets 510 in the channel Ch1 502, and the packet transfer 520 is performed in the channel Ch0 504. Furthermore, hopping to the channel Ch1 502 is stopped in accordance with the packet transfer 520, and the hopping between the channels Ch1 502 and Ch0 504 is then resumed 540.

In the multi-channel MAC scheme, each of the STAs performs the hopping in the multiple channels. When a probability to transfer packets through one arbitrary channel visited by the STA among the multiple channels is p, the STA recognizes a home channel of the visited channel using a seed of the visited channel. Then, after completing the packet transfer, the STA returns the home channel.

Figure 6:
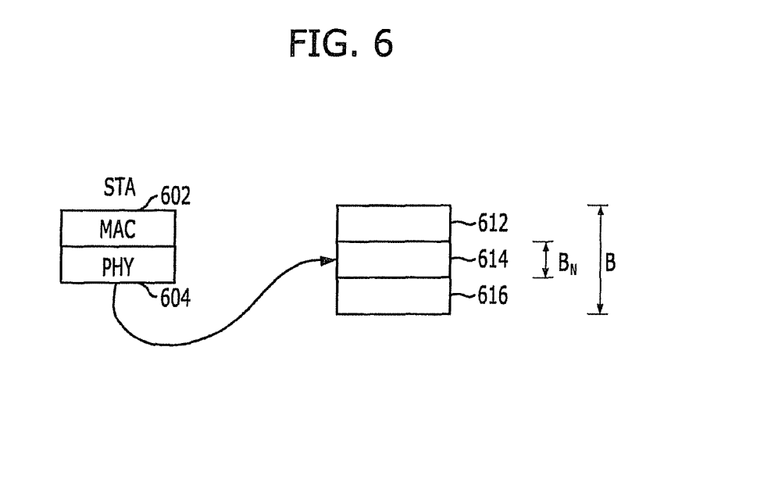
FIGS. 6 to 8 are diagrams explaining channel allocation for access support in the wireless communication system in accordance with the embodiment of the present invention.
Figure 7:
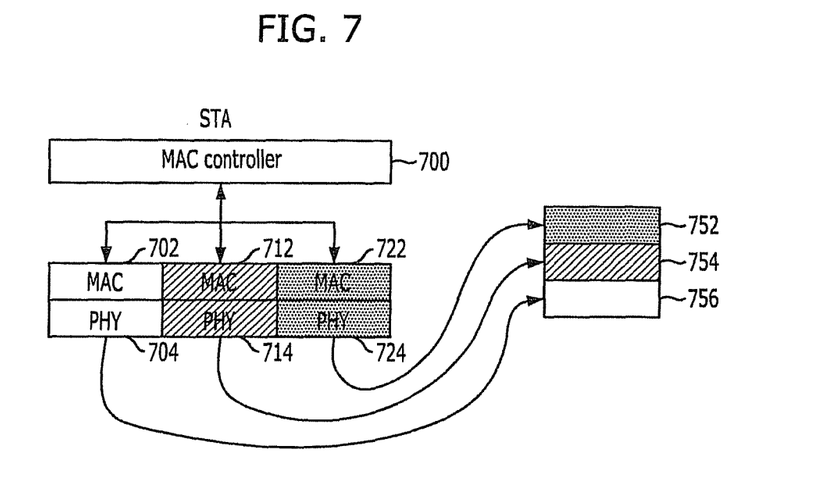
Figure 8:
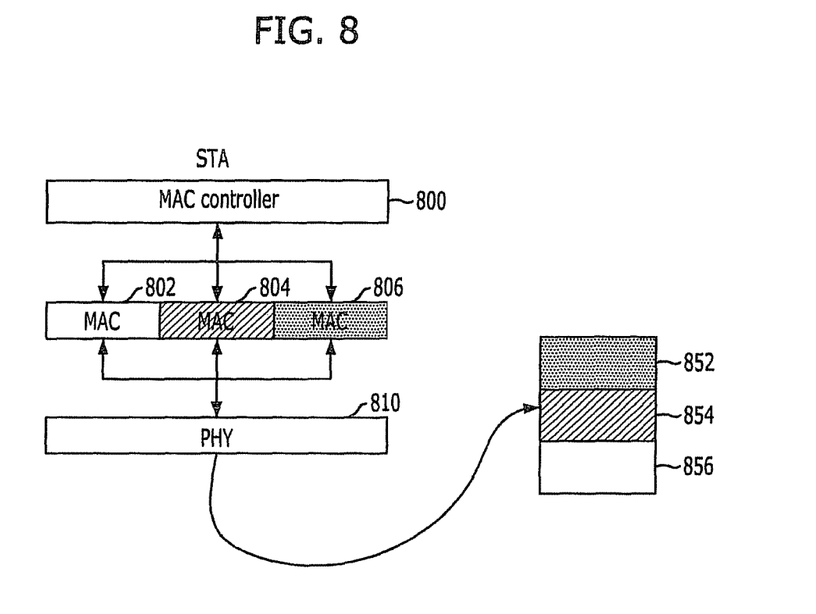

In the WLAN system in accordance with the embodiment of the present invention, a MAC protocol such as a multi-channel Carrier Sense Multiple Access (hereinafter, referred to as CSMA) protocol as well as the multi-channel MAC protocol is applied. As the multi-channel CSMA protocol is applied, performance is improved. For example, the performance of the multi-channel CSMA protocol is more excellent than that of a single-channel CSMA protocol in a fixed collective bandwidth. Furthermore, the multi-channel CSMA protocol exhibits more excellent performance than the single-channel CSMA protocol having a data throughput in the MAC layer, which does not have a linear scale like a data throughput in a physical layer (hereinafter, referred to as PHY layer). In particular, as the multi-channel CSMA protocol is applied, a number of collisions which may occur at the same time in accordance with the simultaneous transfer of data packets may be eliminated to improve the MAC data throughput. Referring to FIGS. 6 to 8, multi-channel allocation in the PHY and MAC layers, which is performed to support access, in the wireless communication system in accordance with the embodiment of the present invention will be described in more detail.

FIGS. 6 to 8 are diagrams explaining the channel allocation for access support in the wireless communication system in accordance with the embodiment of the present invention. FIG. 6 shows a case in which each of the STAs has one wireless resource to get access to a plurality of channels, for example, N channels. FIG. 7 shows a case in which each of the STAs has a plurality of wireless resources, for example, N wireless resources to get access to one channel among a plurality of channels. FIG. 8 shows a case in which each of the STAs has one PHY layer and multiple MAC layers.

Referring to FIG. 6 showing a case in which one wireless resource and N channels are provided in the WLAN system, one MAC/PHY layer 602/604 exists as a wireless resource for each of the STAs. The MAC/PHY layer 602/604 is connected to N channels 612, 614 and 616 through hopping. At this time, the channel hopping of the MAC/PHY layer 602/604 for the access to the N channels 612, 614 and 616, the synchronization, the access, and the control channel utilization in the WLAN system may be supported through the multi-channel MAC protocol.

Referring to FIG. 7 showing a case in which a plurality of wireless resources are provided for one channel among a plurality of channels in the WLAN system, a plurality of MAC/PHY layers 702/704, 712/714, and 722/724 exist as the wireless resources for each of the STAs, and the MAC/PHY layers 702/704, 712/714, and 722/724 correspond to the respective channels 752, 754, and 756. For example, the first MAC/PHY layer 702/704 is connected to the first channel 756, the second MAC/PHY layer 712/714 is connected to the second channel 754, and the MAC/PHY layer 722/724 is connected to the third channel 752.

In the WLAN system, the connection of the multiple MAC/PHY layers to the N channels, for example, the plurality of channels 752, 754 and 756 is performed by n wireless network cards, and controlled by a MAC controller 700 included in each of the STAs. The MAC controller 700 exists as a single unit in an upper layer of the MAC layer, monitors a channel quality depending on the interference between the respective channels, and determines the transfer of packets in consideration of interference corresponding to the monitored channel quality.

Referring to FIG. 8 showing a case in which a plurality of MAC layers and one PHY layer are provided for a plurality of channels in the WLAN system, a plurality of MAC layers 802, 804 and 806 and one PHY layer 810 exist as wireless resources for each of the STAs. The plurality of MAC layers 802, 804 and 806 and the PHY layer 810 are connected to one arbitrary channel among a plurality of channels 852, 854 and 856 through hopping.

In the WLAN system, the connection of the plurality of MAC layers 802, 804, and 806 to N channels, for example, the plurality of channels 852, 854, and 856 is regulated by the MAC controller 800 included in each of the STAs. Furthermore, when the single PHY layer uses the entire bandwidth, a single Fast Fourier Transformer (FFT) included in the WLAN system has a bandwidth determined by the plurality of channels 852, 854 and 856. In the WLAN system, as the same number of antennas use the single channel bandwidth, different channels may be used.

Referring to FIGS. 6 to 8, each of the STAs in the WLAN system has wireless resources and channels. When it is assumed that each of N STAs includes M access nodes, N×M access nodes are provided in the WLAN system. Then, the WLAN system determines the priorities of the M access nodes for each of the STAs. That is, the priorities of the M access nodes for each of the STAs are determined from 1 to M. The determined priorities may be re-determined by the regulation between an AP and the STA in accordance with the network environment. Furthermore, although not shown, the priorities of the access nodes may be determined by a controller which is provided inside the STA or in an upper stage of the STA, depending on the network environments of the respective access nodes or the types of packets transferred through the respective access nodes, for example, service types of data packets.

In the WLAN system, the access priorities of the N STAs are determined. That is, the access priorities of the N STAs are determined from 1 to N. The determined priorities may be regulated and re-determined by an AP in accordance with the network environment. Furthermore, although not shown, the access priorities of the N STAs may be determined by a controller which is provided inside the AP or in an upper stage of the respective STAs, depending on the network environments of the respective STAs or the types of packets to be transferred by the STAs, for example, service types of data packets.

Figure 9:
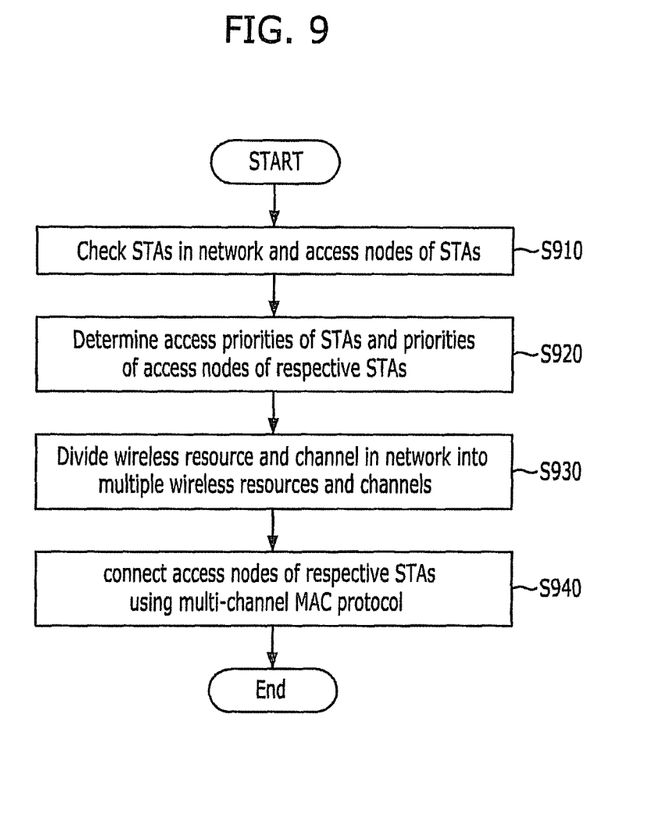
FIG. 9 is a diagram schematically showing the operation of an apparatus for supporting access in the wireless communication system in accordance with the embodiment of the present invention.

Since the access priorities of the STAs and the priorities of the access nodes possessed by each of the STAs are determined in the above-described manner, the access nodes of the respective STAs have different priorities. That is, the priorities of the N×M access nodes existing in the WLAN system are determined. Then, the network connection of the access nodes of the STA having the highest priority to the multiple channels is supported depending on the priorities through multi-channel MAC protocol. Furthermore, the network connection of the access nodes of the other STAs to the multiple channels is supported depending on the priorities of the STAs. At this time, multi-rendezvous may be applied. When a probability for each of the STAs to transfer packets is p, home channels are uniformly allocated to the N access nodes possessed by the STA. In this case, when the access node having the highest priority among the N access nodes uses a home channel, the access node having the next highest priority is caused to continuously use the home channel. Referring to FIG. 9, the operation of access support in the wireless communication system in accordance with the embodiment of the present invention will be described more specifically.

FIG. 9 is a diagram schematically showing the operation of the apparatus for supporting access in the wireless communication system in accordance with the embodiment of the present invention.

Referring to FIG. 9, at a step S910, the apparatus for supporting access checks a plurality of STAs which are to get access to a network of a WLAN system to perform communication, and checks a plurality of access nodes possessed by each of the STAs. In this case, the apparatus checks the number of STAs existing in the WLAN system, the number of access nodes possessed by each of the STAs, the communication environments of the STA and the respective access nodes, the service type of packets which are to be transferred by the STA, and the service types of packets transferred through the respective access nodes. At this time, when the checked number of STAs is N and the number of access nodes possessed by each of the STAs is M, the apparatus checks that N×M access nodes exists in the WLAN system.

Next, at a step S920, the checked information is used to determine the priorities of the plurality of STAs and the access priorities of the access nodes possessed by each of the STAs. When the checked number of STAs is N, the access priorities of the N STAs are determined from 1 to N. When the number of access nodes possessed by each of the STAs is M, the priorities of the M access nodes are determined from 1 to M. The priorities of the N×M access nodes existing in the WLAN system are determined. The determined access priorities of the STAs and the priorities of the access nodes are re-determined depending the network environments and data packets to be transferred, that is, when the checked information is updated.

Next, at a step S930, the apparatus for supporting access checks a wireless resource and channel which may be used during network access in the WLAN system, and divides the checked wireless resource and channel into multiple wireless resources and channels such that the multi-channel MAC protocol may be applied. In this case, the apparatus checks a MAC/PHY layer available for the respective STAs of the WLAN system, and divide the checked MAC/PHY layer into multiple MAC/PHY layers such that each of the STAs has at least one MAC/PHY layer. Furthermore, the apparatus checks a channel available for the respective STAs in the WLAN system, and divides the checked channel into multiple channels, between which interference is minimized, such that the plurality of STAs may get access to the multiple channels.

Then, at a step S940, the multiple wireless resources of the respective STAs are connected to the multiple channels through the multi-channel MAC protocol such that the access nodes of each of the STAs are connected to the network of the WLAN system. In this case, as shown in FIGS. 6 to 8, the multiple MAC/PHY layers of the respective STAs of the WLAN system are connected to the multiple channels through the multi-channel MAC protocol, and the access nodes of each of the STAs are connected to the multiple channels through hopping in accordance with the multi-channel MAC protocol. That is, using the multi-channel MAC protocol, the access nodes of the respective STAs, i.e. the N×M access nodes existing in the WLAN system get access to the network of the WLAN system through the multiple wireless resources and the multiple channels, depending on the priorities. At this time, when the plurality of STAs and the access nodes of the respective STAs get access to the network, the multiple channels are allocated to the plurality of STAs and the access nodes of the respective STAs depending on the access priorities of the STAs and the priorities of the access nodes, which are determined in the above-described manner. The access may be supported by the multi-channel CSMA protocol as well as the multi-channel MAC protocol.

In addition, the plurality of STAs and the access nodes of the respective STAs are connected at the same time through multi-rendezvous. Accordingly, the plurality of STAs of the WLAN system simultaneously get access to the network of the WLAN system through the access nodes of the respective STAs to perform communication through the multiple channels. Since the multiples channels include at least two or more channels between which interference is minimized during the data transfer, the interference during the data transfer through the multiple channels may be minimized to improve the overall data throughput of the system. In this case, except access nodes which are already connected and used among the access nodes inside each of the STAs, the access priorities of the access nodes determined to be higher than those of access nodes connected to other STAs are used as they are. Furthermore, a home channel is uniformly allocated to the access modes inside each of the STAs.

Although not shown, the apparatus for supporting access in the wireless communication system in accordance with the embodiment of the present invention may be included in each of the STAs or AP or separately provided in an upper stage of the STAs or AP. The apparatus for supporting access may be the above-described controller or MAC controller, and the controller or MAC controller includes a checking unit which checks the plurality of STAs existing in the WLAN system and the access nodes of the respective STAs and a determination unit which determines the access priorities of the checked STAs and the priorities of the access nodes of the respective STAs. In addition, the controller or MAC controller includes a multiplexing unit which checks a wireless resource and channel available for the plurality of STAs existing in the network of the WLAN system and devices the wireless resource and channel into multiple wireless resources and channels, and a connection unit which supports the multi-channel MAC protocol such that the respective STAs are connected to the network of the WLAN system through the corresponding access nodes. The connection unit supports the connection of the access nodes of the respective STAs through the CSMA protocol, and regulates the connection of the access nodes of the respective STAs like the MAC controller.

In accordance with the embodiments of the present invention, as the multi-channel MAC technology is supported in a wireless communication system having a multi-user network environment including multiple nodes, multiple users may be easily connected to the network, and smoothly perform communication through the multiple nodes of the respective users. Furthermore, as the multiple users perform communication through the multiple nodes of the respective users using the multi-channel MAC technology, a limited channel, for example, multiple channels may be effectively used to maximize the resource utilization efficiency. In addition, it is possible to provide a service to the multiple users through the multiple channels.

While the present invention has been described with respect to the specific embodiments, it will be apparent to those skilled in the art that various changes and modifications may be made without departing from the spirit and scope of the invention as defined in the following claims.

What is claimed is:

1. A method for supporting access in a wireless communication system, comprising:
    checking a plurality of stations (STA) which are to get access in a network and a plurality of access nodes of the respective STAs;
    determining access priorities of the checked STAs and priorities of the access nodes of the respective STAs;
    dividing a wireless resource and channel available in the network into multiple wireless resources and channels; and
    connecting the access nodes of the respective STAs to the multiple wireless resources and channels using a multi-channel media access control (MAC) protocol, such that each station has access to the respective access node via multiple channels, each handled separately,
    wherein, in said determining the access priorities of the checked STAs and the priorities of the access nodes of the respective STAs, the priority of an intra-node which is an internal access node of the respective STAs is determined to be higher than that of an inter-user node which is an access node between the respective STAs,
    wherein, in said connecting the access nodes of the respective STAs to the multiple wireless resources and channels using a multi-channel media access control (MAC) protocol,
    the access nodes of the respective STAs are connection through multi-rendezvous using the multi-channel MAC protocol, depending on the priorities excluding the priorities of access nodes which are already connected.

2. The method of claim 1, wherein, in said checking a plurality of stations (STA) which are to get access in a network and a plurality of access nodes of the respective STAs,
    the number of STAs and the number of access nodes for each of the STAs are checked, and the total number of access nodes existing in the network is checked in accordance with the checked numbers.

3. The method of claim 2, wherein, in said checking a plurality of stations (STA) which are to get access in a network and a plurality of access nodes of the respective STAs,
    communication environments and service types of packets for the STAs and the access nodes of the respective STAs are checked.

4. The method of claim 3, wherein the service types comprise service types of packets which are to be transferred by the respective STAs and service types of packets transferred through the access nodes of the respective STAs.

5. The method of claim 3, wherein, in said determining the access priorities of the checked STAs and the priorities of the access nodes of the respective STAs,
    the access priorities of the STAs and the priorities of the access nodes are determined depending on the checked communication environments and the checked service types of packets, in order to determine the priorities of the access nodes existing in the network.

6. The method of claim 1, wherein, in said dividing a wireless resource and channel available in the network into multiple wireless resources and channels,
    a MAC/physical (PHY) layer available for the respective STAs in the network is checked, and divided into multiple MAC/PHY layers.

7. The method of claim 1, wherein, in said dividing a wireless resource and channel available in the network into multiple wireless resources and channels,
    a channel available for the respective STAs in the network is checked, and then divided into multiple channels between which interference is minimized when the STAs transfer packets.

8. The method of claim 1, wherein, in sail connecting the access nodes of the respective STAs to the multiple wireless resources and channels using a multi-channel media access control (MAC) protocol,
    the multi-channel MAC protocol is used to connect multiple MAC/PHY layers to the multiple channels.

9. The method of claim 8, wherein, in said connecting the access nodes of the respective STAs to the multiple wireless resources and channels using a multi-channel media access control (MAC) protocol,
    a home channel is uniformly allocated to the internal access nodes of the respective STAs through multi-rendezvous using the multi-channel MAC protocol.

10. The method of claim 8, wherein, in said connecting the access nodes of the respective STAs to the multiple wireless resources and channels using a multi-channel media access control (MAC) protocol,
    the multiple MAC/PHY layers are connected to one arbitrary channel among the multiple channels through hopping using the multi-channel MAC protocol.

11. The method of claim 1, wherein, in said connecting the access nodes of the respective STAs to the multiple wireless resources and channels using a multi-channel media access control (MAC) protocol,
    a multi-channel carrier sense multiple access (CSMA) protocol is further used to connect the access nodes.

12. The method of claim 1, further comprising regulating the connection of the connected access nodes of the respective STAs through MAC.

13. An apparatus for supporting access in a wireless communication system, comprising:
    a checking unit configured to check all access nodes existing in a network through a plurality of stations (STA) which are to get access in the network and a plurality of access nodes of the respective STAs, and check a media access control (MAC)/physical (PHY) layer and channel available for the respective STAs in the network;

a determination unit configured to determine access priorities of the checked STAs and priorities of the access nodes of the respective STAs, and determine the priorities of all the access nodes existing in the network from the determined priorities;

a multiplexing unit configured to divide the checked MAC/PHY layer into multiple MAC/PHY layers, and divide the checked channel into multiple channels between which interference is minimized; and a connection unit configured to connect the multiple MAC/PHY layers to the multiple channels through a multi-channel MAC protocol such that the access nodes of the respective STAs are connected to the multiple MAC/PHY layers and the multiple channels such that each station has access to the respective access node via multiple channels, each handled separately, wherein the determination unit determines the priority of an intra-node serving as an internal access node of the respective STAs to be higher than the priority of an inter-user node serving as an access node between the respective STAs, wherein the connection unit uniformly allocates a home channel to the internal access nodes of the respective STAs through multi-rendezvous using the multi-channel MAC protocol, and connects the access nodes depending on the priorities of the access nodes of the respective STAs excluding access nodes which are already connected.

14. The apparatus of claim 13, wherein the checking unit checks communication environments for the STAs and the access nodes of the respective STAs, service types of packets which are to be transferred by the respective STAs, and service types of packets transferred through the access nodes of the respective STAs, and the determination unit determines the access priorities of the STAs and the priorities of the access nodes depending on the checked communication environments and the checked service types of packets.

15. The apparatus of claim 13, wherein the connection unit connects the multiple MAC/PHY layers to one arbitrary channel among the multiple channels through hopping using the multi-channel MAC protocol.

16. The apparatus of claim 13, wherein the connection unit further uses a multi-channel carrier sense multiple access (CSMA) protocol to connect the access nodes of the respective STAs, and regulates the connection of the connected access nodes of the respective STAs through MAC.

* * * * *